July 14, 1931.  T. JAMES, JR  1,813,930
PISTON AND PISTON RING
Filed April 15, 1929
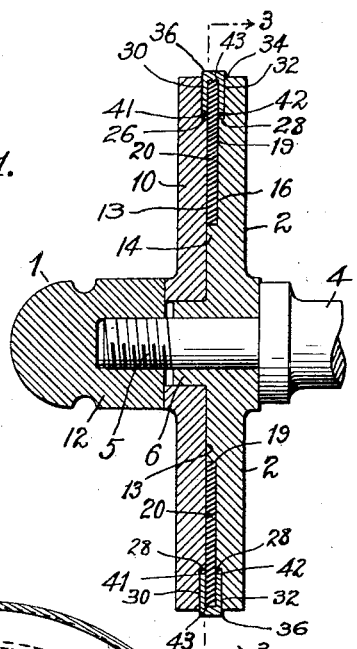
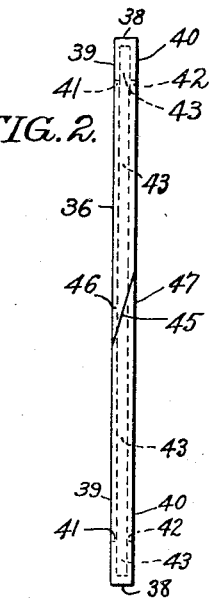
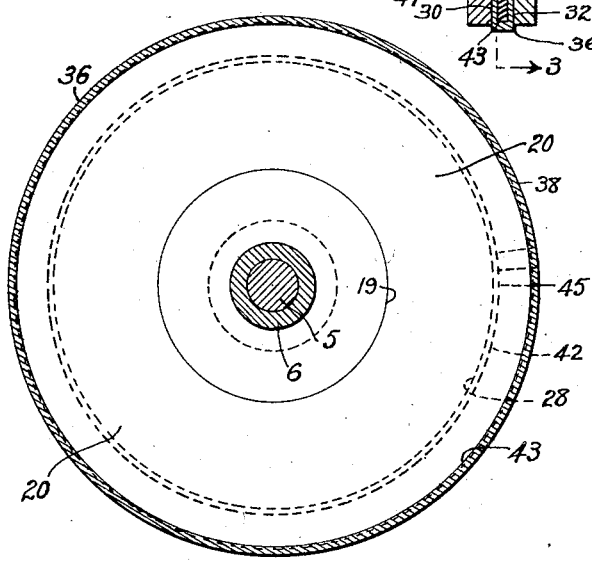
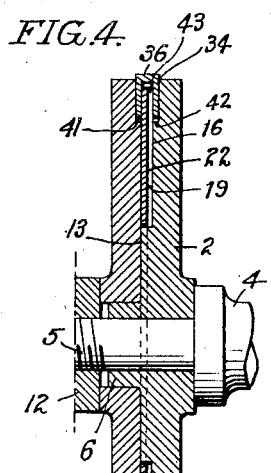
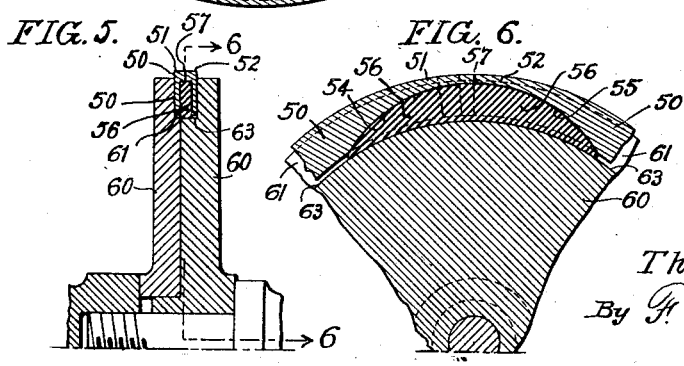
Inventor:
Thomas James Jr.
By F. DeWitt Goodwin
Attorney Patented July 14, 1931

1,813,930

UNITED STATES PATENT OFFICE

THOMAS JAMES, JR., OF PHILADELPHIA, PENNSYLVANIA

PISTON AND PISTON RING

Application filed April 15, 1929. Serial No. 355,033.

My invention relates to improvements in a piston and piston ring adapted for use in cylinders of valves, pumps and engines and particularly for use in apparatus for controlling air under pressure, such as used in air brake systems.

The object of my invention is to provide a piston and piston ring which will reduce the amount of leakage and retain high pressures for a longer period of time than has heretofore been possible; a further object of my invention is to construct a piston and piston ring which will seal the joints between the end faces of the ring and the lateral walls of the piston head; a still further object of my invention is to provide means for sealing the gap formed between the ends of a split ring; and a still further object of my invention is to provide an efficient piston and piston ring for use where a high standard of efficiency is required under long and severe service such as in air brake systems. These together with various other novel features of construction and arrangement of the parts, which will be more fully hereinafter described and claimed, constitute my invention.

Referring to the accompanying drawings Fig. 1 is a central longitudinal sectional view of my improved piston and piston ring; Fig. 2 is a side elevation of the ring detached; Fig. 3 is a transverse sectional view as on line 3—3, Fig. 1; Fig. 4 is a view similar to Fig. 1 showing a different form of sealing member; Fig. 5 is a partial sectional view showing a still different form of sealing member and Fig. 6 is a transverse sectional view on line 6—6, Fig. 5.

In the accompanying drawings in which like reference characters refer to like parts, 1 represents the piston comprising a cylindrical head 2, a piston rod 4 having a reduced threaded end portion 5 extending through a hole in the center of the head 2 and also through a sleeve or hub 6 formed upon the head 2. A follower 10 is secured upon the hub 6 by a nut 12 which clamps the inner lateral wall or facing surface 13 of the follower 10 against the face of a boss 14 formed upon the head 2. The head 2 is provided with a lateral facing surface 16 which is held in spaced relation with the facing surface 13 of the follower 10 by the boss 14, thus forming an annular groove 19 in the piston which is occupied by the sealing member 20, as shown in Figs. 1 and 3. Said member 20 may be formed of flexible material such as rubber, asbestos or other resilient packing material for tightly filling the space between the facing surfaces 13 and 16, or said sealing member may be in the form of a flexible sheet metal disk 22, as shown in Fig. 4, which disk does not entirely fill the groove 19 but may be moved against either of the facing surfaces 13 or 16, by pressure which may enter between the ring and the piston.

The head 2 and the follower 10 are provided with recessed portions forming annular shoulders 26 and 28 and facing surfaces 30 and 32, which form an enlarged outer annular groove 34 occupied by the piston ring 36. The piston ring 36 is of channel formation in cross-section having an outer cylindrical wall 38 and lateral, or end walls, 39 and 40, having inner cylindrical surfaces 41 and 42, formed by the inner edges of the walls 39 and 40. Between the lateral walls 39 and 40 is formed an annular groove 43 which is adapted to receive the peripheral portion of the sealing member 20, as shown in Figs. 1 and 3, or the sealing member 22, as shown in Fig. 4.

The piston ring 36 is split diagonally as indicated by the line 45, thus forming a gap between the adjacent ends 46 and 47 of the ring, as shown in Fig. 2, whereby the ring may be made to fit tightly within a cylinder in a manner well known in the art.

The end surfaces of the walls 39 and 40 of the ring 36 have a working fit between the facing surfaces 30 and 32 of the head 2 and the follower 10, thus the ring 36 may have a slight lateral, or radial, movement relatively to the piston.

The purpose of the present invention is to provide means for preventing leakage at the gap between the ends of the ring and also between the walls 39 and 40 of the ring and said facing surfaces 30 and 32, of the head and follower, which result is accomplished by means of the sealing members. Said members 20 and 22 extend from the groove 19 formed between the head 2 and the follower 10 into the annular groove 43 formed in the piston ring, thus the sealing member will overlap the joint between the inner surfaces 41 and 42 of the ring and the shoulders 26 and 28 formed upon the head 2 and the follower 10. The members 20 and 22 are annular and extend across the diagonal gap 45 formed between the ends of the ring, thus overlapping the ends of the ring and closing said gap, thus insuring against any leakage between the ends of the ring and also between the ring and the piston. The member 20 may be made of resilient material and slightly compressed into the grooves 19 and 43 formed in the piston and in the ring, respectively, thus tightly sealing the joints between the ring and the piston and at the same time permitting a slight lateral movement of the ring relatively to the piston and also allowing the ring to be compressed to fit tightly within the cylindrical wall of a cylinder.

Fig. 4 illustrates that the sealing member may be made in the form of a disk 22 of flexible material, such as sheet metal, and mounted loosely in the annular groove 19 so that it may move by any medium under pressure and thus forced against either side of the grooves 19 and 43, thereby overlapping the joints between the ring and the piston.

The walls or facing surfaces 13 and 16 are preferably in alignment with the inner surfaces of the walls 39 and 40 of the ring so that the groove 19 in the piston will be the same width as the groove 43 in the ring, thereby insuring the sealing member lying evenly upon said walls, which are thus in alignment.

The form of my invention illustrated in Figs. 5 and 6 embodies a piston ring 50 having split ends 51 and 52 in which are formed grooves 54 and 55, presenting an open face upon the inner cylindrical surface of the ring. Said grooves do not extend entirely around the ring but extend a short distance beyond either side of the gap 57 formed between the ends 51 and 52 of the ring.

A sealing member 56, preferably of flexible material, is positioned within the grooves 54 and 55 and shaped to correspond with the shape of said grooves, for filling the latter and also overlapping the gap formed between the ends of the ring. The piston 60 is provided with an annular groove 61 which is occupied by the ring 50. Said sealing member 56 has its inner surface shaped to conform with the cylindrical wall 63 of the piston which forms the bottom of the groove 61. The sealing member 56 tightly seals the gap between the ends of the ring and also seals the joints between the ring and the piston throughout the length of the member 56. The ring 50 may be provided with a number of grooves arranged around its inner wall for receiving a number of sealing members similar to the member 56.

By providing a plurality of sealing members 56 spaced around the piston ring the joints will be sealed and said members 56 will exert a uniform pressure against the ring at several radial joints due to the resilient quality of the material of the sealing members.

Various other changes in the construction and arrangement of the parts may be made without departing from my invention.

I claim:—

1. A cylindrical piston head, a cylindrical follower, a central boss upon one of said parts, means for detachably securing the follower upon the head whereby said boss will hold the outer portions of said head and said follower in spaced relation to each other forming an annular groove between said parts, a piston ring positioned between said head and said follower and movable radially between said head and said follower, said ring having an annular groove formed upon the inner face thereof, and a flexible member positioned between said head and said follower with its peripheral portion extending into said groove formed in the ring for overlapping the joint between the ends of the ring and the joints between the inner cylindrical face of the ring and the adjacent portions of said head and said follower.

2. A cylindrical piston head, a cylindrical follower, a central boss upon one of said parts, means for detachably securing the follower upon the head whereby said boss will hold the outer portions of said head and said follower in spaced relation to each other forming an annular groove between said parts, a piston ring positioned between said head and said follower and movable radially between said head and said follower, said ring having an annular groove formed upon the inner face thereof, a member positioned between said head and said follower with its peripheral portion extending into said groove formed in the ring for overlapping the joint between the ends of the ring and the joints between the inner cylindrical face of the ring and the adjacent portions of said head and said follower, and said member movable axially within said groove formed between the follower and said head and within said groove formed in the ring.

In testimony whereof I affix my signature.

THOMAS JAMES, Jr.